United States Patent [19]

Jöres et al.

[11] 3,870,584
[45] Mar. 11, 1975

[54] AUTOMATIC DOUBLE-SIDE ADHESIVE DEVICE FOR BANDS OR WEBS

[75] Inventors: Willi Jöres, Opladen; Franz Hoffacker, Langenfeld; Helmut Lehmann, Leverkusen, all of Germany

[73] Assignee: Agfa-Gevaert Aktiengesellschaft, Leverkusen, Germany

[22] Filed: Apr. 17, 1973

[21] Appl. No.: 352,015

[30] Foreign Application Priority Data
Apr. 22, 1972 Germany............................ 2219826

[52] U.S. Cl.................. 156/505, 156/159, 156/304, 156/507, 156/545
[51] Int. Cl............................................. B31f 5/00
[58] Field of Search .......... 156/505, 507, 508, 517, 156/545, 304, 502, 511, 159

[56] References Cited
UNITED STATES PATENTS
| | | | |
|---|---|---|---|
| 2,565,009 | 8/1951 | Wallingsford | 156/505 |
| 3,642,555 | 2/1972 | Nagoshi et al. | 156/505 |
| 3,748,208 | 7/1973 | Schnellmann | 156/443 |

Primary Examiner—William A. Powell
Assistant Examiner—Brian J. Leitten
Attorney, Agent, or Firm—Connolly and Hutz

[57] ABSTRACT

Apparatus for joining two webs together which comprises suction tables, which are transversely movable along parallel guides. Cutting means are provided for near the place of intended joining. Beyond the web before the joining place a clamp is mounted to hold one edge of the joint between the webs whilst the adhesive tape is applied and to take up any traction involved in applying the adhesive tape.

9 Claims, 3 Drawing Figures

PATENTED MAR 11 1975 3,870,584

AUTOMATIC DOUBLE-SIDE ADHESIVE DEVICE FOR BANDS OR WEBS

This invention relates to an adhesive device for joining two webs together end to end. It consists of a cutting device working in a known manner to give clean cut edges a conveyor device for bringing the edges of the two webs into juxtaposition with each other and an adhesive tape carriage which is displaceable transversely to the web. The essential parts of the carriage consist of an upper and a lower take off roller for the adhesive tape and rubber pressure rollers which press against the web and are set into rotation by the movement of the adhesive tape carriage.

When processing bands or webs of material often substantial lengths of material are unavoidably left over. These remnants are rolled up to form so-called remnant rolls. Since processing of the webs requires rolls of uniform diameter (uniform lengths of web), the remnant rolls cannot be put into production owing to their varying roll diameters or web lengths.

Recently it has become the practice to join up these remnant rolls into larger units in order to avoid unnecessary loss of material. This invention relates to an adhesive device which is particularly suitable for joining up remnant rolls.

Adhesive device for webs are known which join two webs together with their ends overlapping. The beginning of the new web is coated with glue or adhesive and the end of the other web is cut with a serrated knife. The portion coated with glue is then simply placed on the other web with the ends overlapping. A lap joint is thereby produced which could equally well be produced using an adhesive tape. Although the device described can be operated continuously, i.e., without any standstill periods, the lap joint has considerable disadvantages (e.g., change in thickness of the web) for subsequent processing.

Using another type of adhesive device, the webs are placed end to end and joined together with adhesive tape on both sides whilst they are stationary. They are first placed overlapping on a suction table and then moved apart. The cut off remnants of the web must be removed by hand. The suction table with the ends of the webs on it is then placed under the double-sided adhesive device and the ends are glued together. Finally, the projecting remnants of adhesive tape are cut off by hand with scissors. The main disadvantage of this device is the need for manual operation and the time and labour which this requires.

It is an object of this invention to automate the bonding process for joining two rolls and to obviate the disadvantages described above.

In the adhesive devices previously known, in which the adhesive tapes are pressed on to the webs by rubber pressure rollers, the tape is glued to the ends of the web and therefore all adjoining areas are then under traction during the movement of the adhesive tape carriage. This traction results from the torque required for rolling off the adhesive tape. When using adhesive tapes which carry very powerful adhesives, the traction may become so great that the web is deformed or pulled out of its correct position. It is an object of this invention to eliminate this undesirable effect using an automated device of the type described above.

According to the invention, this problem is solved by the following combination of features:

a. The conveyor devices for bringing the cut edges of the webs together consist of suction tables which can be displaced towards and away from each other by means of hydraulically operated parallel guides.

b. The cutting device is arranged near the place where the bond is to be produced and can be completely swung out of the operative position by means of a hydraulic control.

c. Pincers are arranged laterally to the web in the plane of the rubber pressure rollers at the level of the position where the bond is to be produced to hold the overhanging ends of the strips of adhesive and take up the traction required for unrolling the adhesive tapes during the bonding process.

The pincers are preferably also operated by a hydraulic control.

According to another feature of the invention, the pincers can be moved out of their operative position to make way for punching devices which remove the overhanging ends of the strip of adhesive on both sides of the web together with a halfmoon shaped piece of web after the ends of the webs have been joined together.

According to one advantageous embodiment of the invention, the cutting device consists of a cutting table with suction apertures and two pairs of cutting knives. Each pair of cutting knives consists of a fixed lower knife and a rotatably mounted upper knife which can be pressed resiliently against the workpiece.

An abutment is advantageously provided in the middle of the cutting table, the ends of the webs which are to be joined together being moved up against each side of the abutment before the cutting process begins.

The apparatus according to the invention enables automatic double sided bonding to be carried out reliably with a very low rate of rejects. Another advantage of the invention is that is substantially trouble-free. Moreover, the wastage in adhesive tape is much less than in other, previously known processes. Manual labour is reduced to such an extent that a single operator can operate two adhesive devices at once.

An example of the invention is illustrated in the drawings and described in detail below.

Figure 1:
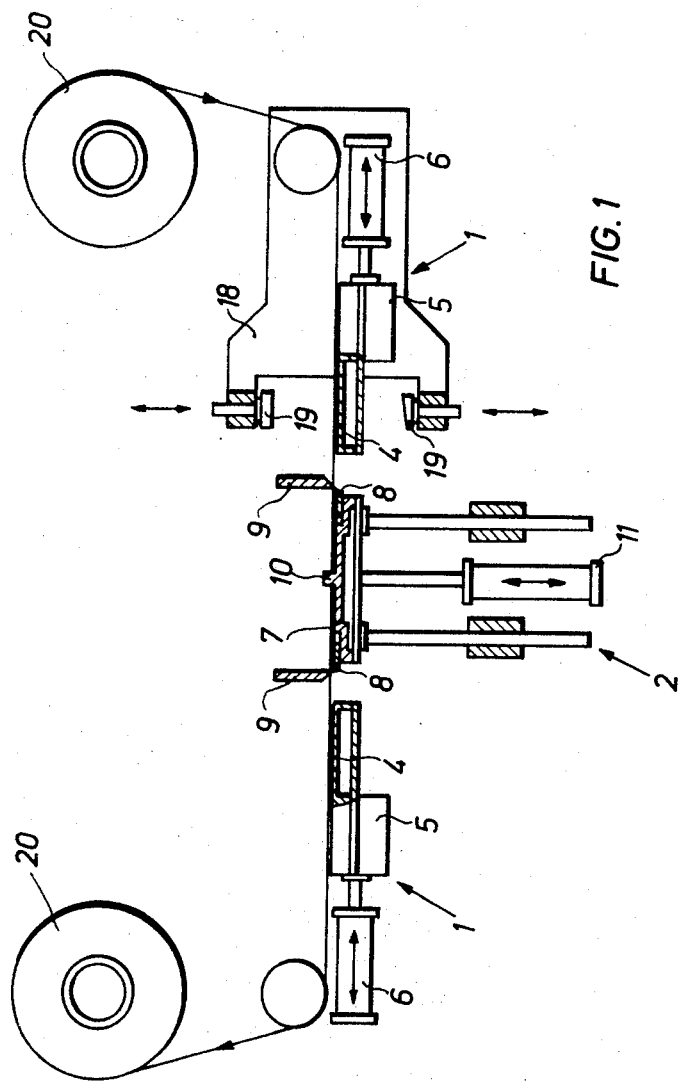
FIG. 1 is a front view.
Figure 2:
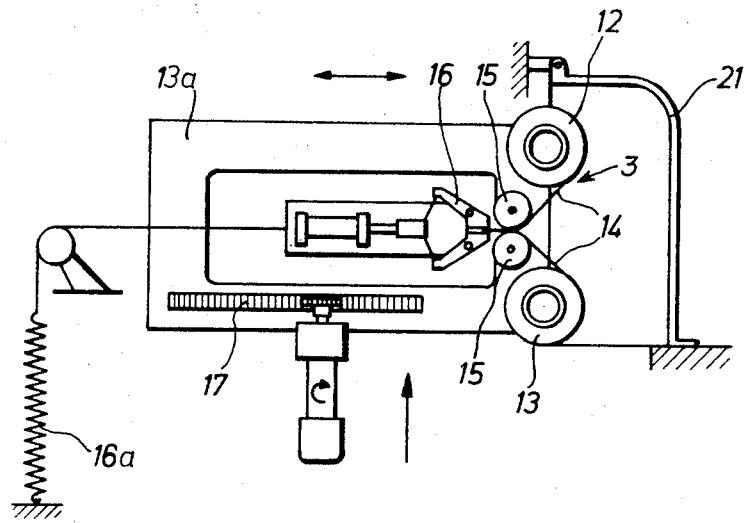
FIG. 2 is a cross-section through the adhesive tape carriage.

According to FIG. 1, the adhesive device basically consists of two conveyor devices 1, the cutting device 2 between them and the adhesive tape carriage 3 (FIG. 2).

The conveyor device 1 consists basically of a suction table 4 which is adapted to be displaced in the horizontal direction by a parallel guide 5 which is driven by a hydraulic mechanism 6.

The cutting device 2 comprises a cutting table 7 and pairs of cutting knives, each pair consisting of a lower knife 8 and an upper knife 9. An abutment 10 is provided along the middle of the cutting table 7. It consists of a bar about 10 mm high which extends transversely across the table. The table 7 can be completely removed by the hydraulic control 11.

The adhesive tape carriage 3 consists of an upper and lower adhesive tape take off reel, 12, 13 which are mounted on a long armed projecting U-shaped bracket 13a. The adhesive tapes 14 run between rubber pressure rollers 15 which press their adhesive surfaces together.

For the bonding operation, the adhesive tape carriage 3 is moved over the line along which the abutting ends of the two webs are to be joined together. A strip of adhesive 14 is applied to the top and under surface of the web on this line and the two strips are pressed together by the rubber pressure rollers 15 which are trailed along by the carriage. One rubber pressure roller is therefore above the web and the other below it during the bonding operation.

The pressure rollers 15 are driven by the movement of the adhesive tape carriage from the web and thereby unwind the adhesive tapes 14. A certain torque is required to unwind the tapes. This torque produces a traction which acts along the line of the joint against the direction of movement of the carriage 3. In order to prevent this hydraulically operated pincers 16 are arranged in front of the pressure rollers 15. These pincers grip the overhanging ends of the strips of adhesive tape and take up the traction acting on the tapes. The carriage 3 is driven by a motor by way of the rack and pinion transmission 17. The pincers 16 can be locked mechanically in their operative position. The lock is released (not shown) when the bonding operation is finished. The pincers 16 are then returned to their inoperative position by the spiral spring mechanism 16a.

The overhanging remnants of adhesive tape to the left and right of the web are cut off with a punching device 18 which comprises two halfmoon-shaped punching knives 19 which are moved into position by parallel guides (not shown).

Figure 3:
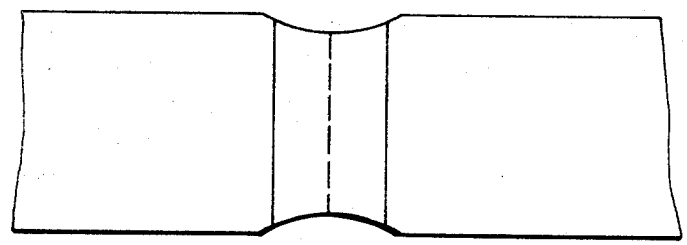
FIG. 3 shows the form of a joint between two web ends

The punches cut off the ends of the adhesive tapes and at the same time a halfmoon-shaped portion of web from each side (see FIG. 3). On no account may overhanging remnants of adhesive tape be left on the web. On one side, the strip of adhesive tape cut off is left on the ends of the rolls of adhesive tape and is reinserted in the pincers 16 when the adhesive tape carriage 3 is returned. The adhesive tape remnant on the other side drops into a waste bin after it has been removed from the web by the punch knives.

The method of carrying out a bonding operation will now be described. The end of each remnant roll 20 is first placed by hand over its bonding table 4 and on to the cutting table 7. The ends of the two webs do not touch each other on the cutting table. They are separated from each other by the abutment 10. Rails placed laterally (not shown) ensure that the ends of the webs are placed parallel to each other. The ends of the webs are then secured to the bonding tables 4 and cutting table 7 by suction. The subsequent stages of the operation are completely automatic. When the protective hood 21 is closed (FIG. 2), the mechanical bonding operation is started by remote control. The first part of the apparatus to enter into operation is the cutting device 2. The top knives 9 are placed transversely across the webs and cut off the ends of the webs, supported by the fixed lower knives 8. Clean cut edges are thereby obtained at the ends of the webs. During this operation, the web remnants are held to the cutting table 7 by suction. The top knives 9 are then removed from their operative position and at the same time the cutting table 7 moves downwards and the cut off portions of webs are thrown into a waste bin by a blast of air after the vacuum has been released. The ends of the webs with their freshly cut edges are kept on the bonding tables 4 by suction to prevent them from slipping.

In the next stage of the operation, the two bonding tables are moved towards each other by hydraulic controls 6 until the ends of the webs touch each other and lie end to end. During this movement and all subsequent stages of the operation, the cutting table 7 remains in its lowered position (position of rest) so that it does not interfere with the bonding operation.

The rack and pinion transmission 17 now moves the adhesive tape carriage 3 into the position where the joint is to be made. During this movement, the carriage drags the pincers 16 along with it. The pincers are then locked and the traction which the moving carriage exerts on the strips of adhesive tape is taken up by the pincers. The carriage 3 now moves exactly over the position of the joint. During this movement, the adhesive tapes which have just been rolled off are pressed against the adjoining ends of the webs from above and below by the rubber pressure rollers. The pincers 16 do not open until the carriage 3 has reached the other side of the web. The lock on the pincers is then released and the pincers are returned to their inoperative position by the spring 18.

In the last stage of the operation, the overhanging ends of adhesive tape must be cut off the sides of the joined webs. For this purpose, the punching device 18 is moved into position by the remote control and the punching operation is started. This completes the bonding operation. The vacuum is now removed from the suction tables and the web can be rolled up at high speed. When the web has been rolled up, the bonding tables 4, cutting table 7 and adhesive tape carriage 3 return to their starting positions.

What we claim is:

1. An apparatus for joining two elongated webs end-to-end to each other comprising a pair of web supplies for feeding the two webs together in substantial abutment end-to-end in a plane, an adhesive tape dispenser having a pair of spaced adhesive tape supplies disposed above and below the abutting ends of the webs for feeding a pair of adhesive tapes in mutually adhesive contact with each other in the plane of abutment of the webs, traversing means connected to the adhesive tape dispenser for moving it laterally across the abutting ends of the webs, a pair of pressure rollers on the dispenser disposed immediately above and below the plane of the abutting ends of the webs and plane of contact of the adhesive tapes which adhesively join the ends of the adhesive tapes in a joint end, a clamp on the adhesive tape dispenser having gripping jaws disposed above and below the plane of the abutting ends of the webs and in line with the contacting surfaces of the pressure rollers whereby the clamp grasps the joint ends of the adhesive tapes fed from the adhesive tape supplies between the pressure rollers and through them in a direction disposed away from the abutting ends of the webs whereby the joint ends are securely engaged in the clamp, an anchor on the clamp for holding it and the clamped joint ends of the tapes and restraining them against movement toward the abutting ends of the webs as the traversing means moves the adhesive tape dispenser and adhesive tape supplies across both sides of the abutting ends of the webs with the pressure rollers passing forcefully against opposite surfaces of the abutting ends of the webs whereby lengths of tapes are applied above and below the abutting ends of the webs to join them together without pulling the webs to one side, and final cutting means for severing the ends of the applied adhesive tapes at the sides of the abutting ends of the webs which they have joined together.

2. An apparatus as set forth in claim 1 wherein a cutting table is disposed between the web supplies, cutting means is incorporated in the cutting table for accurately cutting off the ends of the webs to be joined to each other, contact conveyors being provided which have surfaces constructed and arranged to grip the ends of the webs to feed them towards abutment with each other end-to-end, and translating means connected to the cutting table for moving it in contact with the abutting ends of the webs and away from them.

3. An apparatus as set forth in claim 2 wherein the contact conveyor means comprises suction gripping means and planar traversing means for moving the suction gripping means and gripped webs in a direction parallel to the plane of the abutting ends of the webs.

4. An apparatus as set forth in claim 2 wherein the cutting means associated with the table comprises rotating knives.

5. An apparatus as set forth in claim 4 wherein a resilient anchor is connected to the clamp.

6. An apparatus as set forth in claim 5 wherein the clamp comprises a pair of pincer-like jaws, and hydraulic means connected to the clamp for engaging and disengaging the jaws about the joint end of the tapes.

7. An apparatus as set forth in claim 1 wherein the final cutting means is constructed and arranged to nip portions on either side of the taped abutting ends of the webs when they cut off the applied tapes at the sides of the webs.

8. An apparatus as set forth in claim 1 wherein the adhesive tape dispenser comprises a C-shaped frame having a pair of slightly spaced arms and an opening within the frame, a tape supply and pressure roller being mounted on each of the arms, and the clamp being disposed in the opening in line with the slight space between the arms.

9. An apparatus as set forth in claim 1 wherein the adhesive dispenser traversing means comprises a rack and pinion.

* * * * *